United States Patent [19]
Takezaki et al.

[11] Patent Number: 5,535,870
[45] Date of Patent: Jul. 16, 1996

[54] WET MULTIDISC FRICTION ENGAGING DEVICE

[75] Inventors: Kenichi Takezaki, Chitose; Hajime Ohnuma, Eniwa, both of Japan

[73] Assignee: Dynax Corporation, Hokkaido, Japan

[21] Appl. No.: 421,487

[22] Filed: Apr. 13, 1995

[51] Int. Cl.$^6$ .......................... F16D 13/60; F16D 69/02
[52] U.S. Cl. ................... 192/70.14; 192/107 M
[58] Field of Search .................. 192/70.14, 70.12, 192/107 R, 107 M

[56] References Cited

U.S. PATENT DOCUMENTS

| | | |
|---|---|---|
| 3,494,452 | 2/1970 | Finkin . |
| 4,180,622 | 12/1979 | Burkhard et al. . |
| 5,029,686 | 7/1991 | Yesnik . |
| 5,048,654 | 9/1991 | Yesnik . |
| 5,154,683 | 10/1992 | Phelps . |
| 5,452,784 | 9/1995 | Miyoshi et al. . |

FOREIGN PATENT DOCUMENTS

| | | | |
|---|---|---|---|
| 3326409 | 3/1984 | Germany | 192/70.14 |
| 2-154819 | 6/1990 | Japan | 192/107 M |
| 4-181022 | 6/1992 | Japan | 192/107 M |
| 4-366029 | 12/1992 | Japan | 192/107 M |

*Primary Examiner*—Andrea L. Pitts
*Attorney, Agent, or Firm*—Howson and Howson

[57] ABSTRACT

A wet, multidisc friction engaging device, has alternately arranged, interleaved discs, each disc consisting of a core plate and a friction member on only one face of the core plate. The friction members are engageable with the core plates of adjacent discs. Some of the friction members have a high coefficient of static friction for high torque transmission. Other friction members have a high coefficient of dynamic friction to reduce shock and noise which tend to occur upon completion of engagement. The friction members having a high coefficient of static friction tend to have a relatively poor heat resistance. However, the core plates which they engage are thicker than the core plates engaged by the other friction members, so that heat generated upon engagement is diffused. The fact that thinner core plates are used for engagement by the friction members having a high coefficient of dynamic friction reduces the overall length of the device.

8 Claims, 2 Drawing Sheets

WET MULTIDISC FRICTION ENGAGING DEVICE

BRIEF SUMMARY OF THE INVENTION

This invention relates to friction devices, and more particularly to a wet, multidisc friction engaging device usable, for example, in the automatic transmission of an automobile or in the power transmission of an industrial or construction machine. Wet, multidisc friction engaging devices are widely used as clutches, and as friction brakes in planetary gear mechanisms.

A wet, multidisc friction engaging device is primarily a device for transmitting torque. The friction elements are immersed in oil. The device must be able to transmit high torque and not be adversely affected by high temperatures. In the design of any such friction engaging device, shock and noise produced upon completion of engagement must be taken into consideration.

A friction member having a large coefficient of static friction has a high torque transmitting capacity. However, such a friction member typically has a low coefficient of dynamic friction and its heat resistance is not particularly good.

On the other hand, a large coefficient of dynamic friction is desirable to prevent shock and noise from occurring upon completion of the engagement of the engageable elements of the device. In this specification a "large coefficient of dynamic friction" means a large ratio of the coefficient of dynamic friction to the coefficient of static friction. In general, a friction member having a large coefficient of dynamic friction also has heat resistance superior to that of a friction member having a comparatively low coefficient of dynamic friction. However, a friction member having a large coefficient of dynamic friction and superior heat resistance also generally has a low coefficient of static friction and a low torque transmitting capacity.

At the present time, it is difficult to produce a commercially acceptable friction member combining a high torque transmitting capacity, a large coefficient of dynamic friction and superior heat resistance. Accordingly, it has not been considered possible to produce a wet, multidisc friction engaging device having all three of these desirable characteristics.

The principal object of this invention is to provide a wet, multidisc friction engaging device which has a high torque transmitting capacity, good heat resistance and also a high coefficient of dynamic friction. It is also an object of the invention to provide a wet, multidisc friction engaging device which has a high torque transmitting capacity and good heat resistance, and which is also resistant to shock and noise upon completion of engagement.

The wet, multidisc, friction engaging device in accordance with the invention has first and second sets of discs interleaved with one another in alternating relationship, with the discs of the first set being engageable with the discs of the second set. Each of the discs comprises a friction member on only one side. The core plate of each disc, except for one, is opposed to, and engageable with, a friction member of an adjacent disc. The friction members include first friction members and second friction members. The coefficient of static friction of the first friction members is relatively high compared to the coefficient of static friction of the second friction members. However, the coefficient of dynamic friction and heat resistance of the second friction members are relatively high compared to the coefficient of dynamic friction and heat resistance of the first friction members. Each core plate opposed to and engageable with one of the first friction members has a thickness relatively large in comparison to the thickness of each of the core plates opposed to and engageable with a second friction member.

In the preferred embodiment, the friction members are all on the same sides of the discs, and each friction member is opposed to and engageable with the core plate of an adjacent disc.

The heat generated by the engagement of the first friction members, which have large coefficients of static friction, is easily diffused through the relatively thick core plates which are engaged by these first friction members. Thus, the thick core plates compensate for the comparatively poor heat resistance of the first friction members.

Because the second friction members have superior heat resistance, thermal diffusion is less important, and the core plates opposed to these second friction members can be made comparatively thin, thereby reducing the overall length of the friction engaging device.

Further objects, details and advantages of the invention will be apparent from the following detailed description, when read in conjunction with the drawings.

DETAILED DESCRIPTION

Figure 1:
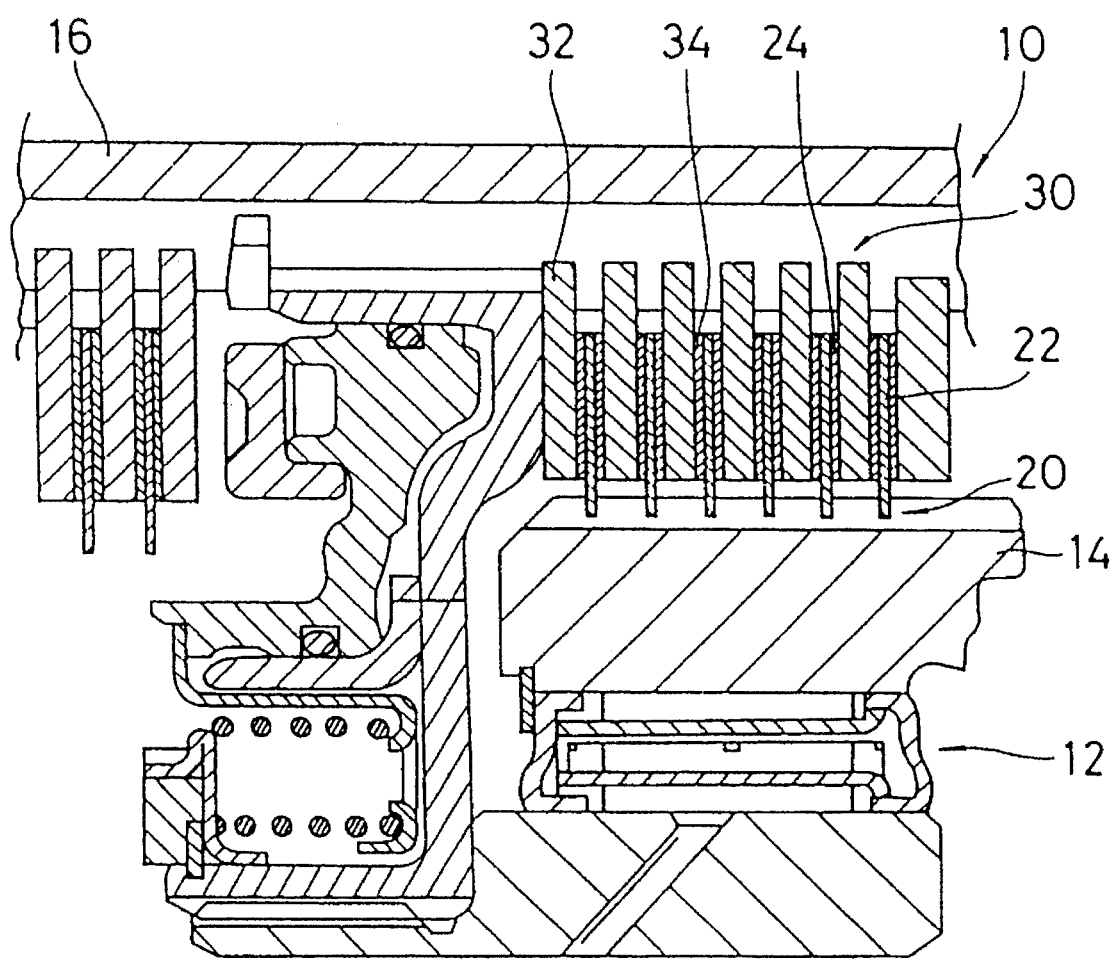
FIG. 1 is a longitudinal section through a part of a wet, multidisc friction engaging device in accordance with the invention.

The wet, multidisc friction engaging device 10, as partly shown in FIG. 1, is a part of an automatic transmission. Discs 20 are splined to the outer race 14 of a one-way clutch 12. Discs 20 are interleaved with discs 30, which are splined to a housing 16. The discs 30, being splined on the housing, which is an outer member, may be referred to as "outer" discs, while, the discs 20, being splined on the clutch race 14, which is an inner member surrounded by the outer member, may be referred to as "inner" discs. The automatic transmission has a hydraulic operating mechanism (not shown), for example a piston, which moves the inner discs into and out of engagement with the outer discs.

Figure 2:
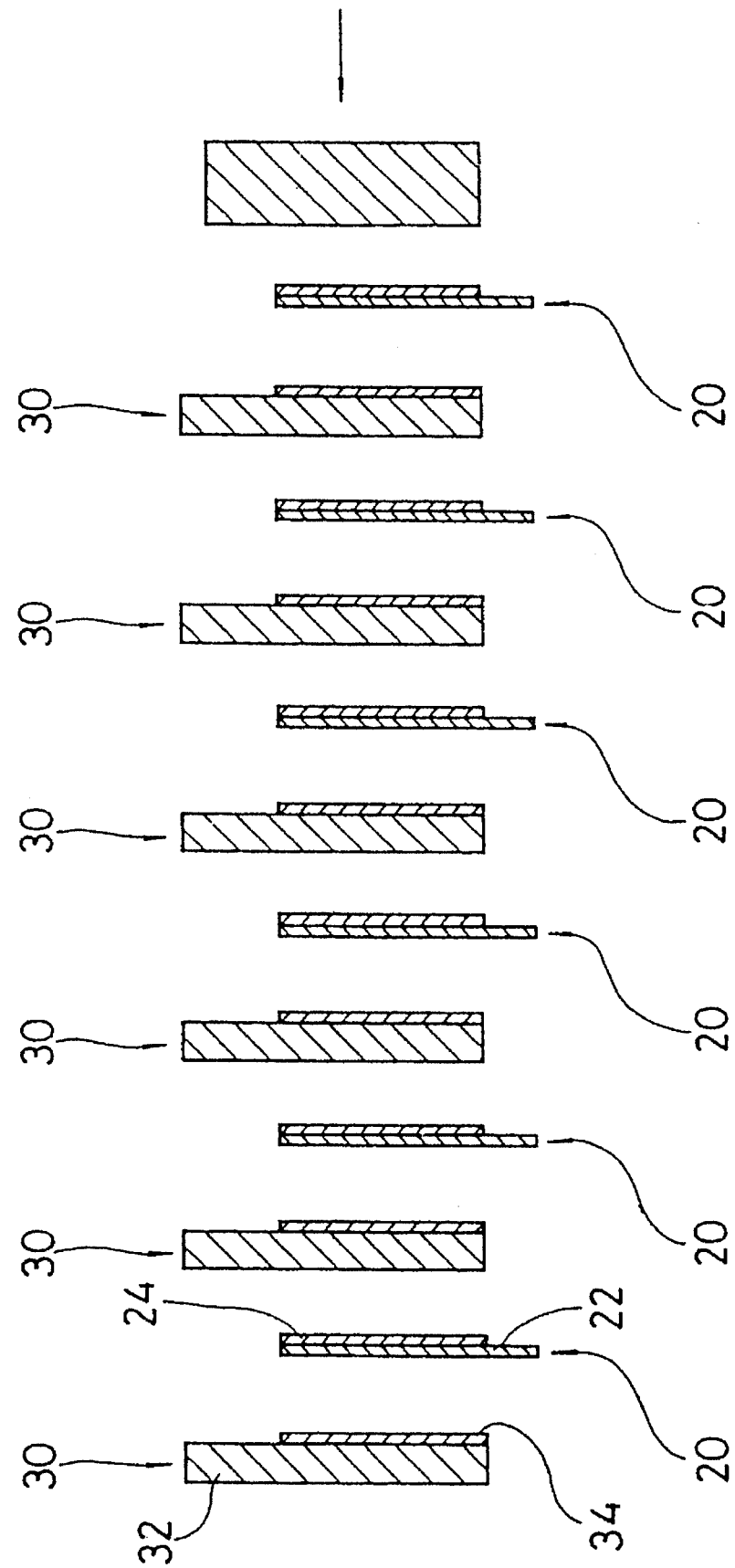
FIG. 2 is an enlarged, exaggerated, sectional view showing the interleaved discs of the device of FIG. 1.

As shown more clearly in FIG. 2, each of the inner discs 20 comprises a core plate 22 having a friction member 24 attached to one of its faces. Similarly, each of the outer discs 30 comprises a core plate 32 having a friction member 34 attached to one of its faces. The friction members 24 and 34 are all on the same sides of the core plates 22 and 32, namely the right-hand sides as shown in FIG. 2. The opposite faces of the core plates have no friction members attached to them. The core plates 22 of the inner discs 20 are relatively small in thickness, whereas the thickness of the core plates 32 of the outer discs is relatively large.

The friction members 24 on the inner discs 20 have a relatively large coefficient of static friction, compared to that of the friction members 34. Friction members 24 are arranged to engage the core plates 32 of the outer discs 30, except for the leftmost core plate 32 in FIG. 2.

The friction members 34, on the outer discs 30, have a relatively high coefficient of dynamic friction compared to that of the friction members 24. Friction members 34 also have superior heat resistance compared to that of friction members 24. Friction members 34 are arranged to engage the core plates 22 of the inner discs 20.

With the friction members arranged as described above, the friction members 24, which have a relatively large coefficient of static friction, are adapted to engage the core plates 32, having relatively large thicknesses. Thus, heat generated by the frictional engagement of members 24 with core plates 32 is diffused through the thick core plates. Because friction members 34, which have a relatively large coefficient of dynamic friction, are superior in heat resistance, core plates 22, which are engaged by friction members 34, can be made comparatively thin. In this way, the overall length of the wet, multidisc friction engaging device can be reduced.

In summary, the friction members having inferior heat resistance but a high coefficient of static friction and high torque transmitting capacity, are opposed to relatively thick core plates. On the other hand, the friction members which have superior heat resistance and a relatively large coefficient of dynamic friction are opposed to relatively thin core plates. Thus, the wet, multidisc friction engaging device in accordance with the invention combines the characteristics of two different kinds of commercially available friction members: those having a high coefficient of static friction and those having a high coefficient of dynamic friction. The disadvantages of each type of friction member are compensated for by the other type of friction member, and the resulting wet, multidisc friction engaging device exhibits a combination of desirable characteristics, including high torque transmitting capacity, superior heat resistance, and a large coefficient of dynamic friction for preventing shock and noise upon completion of the engagement of the friction members with their core plates.

Although the embodiment described above utilizes thick core plates and friction members having a high coefficient of dynamic friction for the outer discs, many advantages of the invention can be realized in an embodiment in which the inner discs are composed of thick core plates and friction members having high coefficients of dynamic friction, while the outer discs are composed of comparatively thin core plates and friction members having a relatively high coefficient of static friction. It is also possible to utilize a hybrid arrangement of discs, in which some of the inner discs are composed of thick core plates and friction members having high coefficients of dynamic friction; other inner discs are composed of thin core plates and friction members having high coefficients of static friction; some of the outer discs are composed of thin core plates and friction members having high coefficients of static friction; and other outer discs are composed of thick core plates and friction members having high coefficients of dynamic friction.

Still other modifications, which will occur to persons skilled in the art, may be made without departing from the scope of the invention as defined in the following claims.

We claim:

1. In a wet, multidisc, friction engaging device comprising first and second groups of friction members, the improvement wherein the friction members of the first group have a coefficient of static friction greater than that of the friction members of the second group, and said friction members of the second group have a coefficient of dynamic friction greater than that of the friction members of said first group.

2. A wet, multidisc, friction engaging device according to claim 1 including a plate engageable by each of said friction members, in which said friction members of the second group have a heat resistance greater than that of the friction members of the first group, and in which the plates engageable by said friction members of the first group are thicker than the plates engageable by said friction members of the second group.

3. In a wet, multidisc, friction engaging device comprising first and second groups of discs, each disc having a friction member, the improvement wherein the friction members of the first group of said discs have a coefficient of static friction greater than that of the friction members of the second group of discs, and the friction members of said second group of discs have a coefficient of dynamic friction greater than that of the friction members of the discs of said first group.

4. A wet, multidisc, friction engaging device according to claim 3 in which each of said discs comprises a core plate, in which each disc has its friction member on only one side of its core plate, and each friction member is engageable with the core plate of an adjacent disc.

5. A wet, multidisc, friction engaging device according to claim 3 in which each of said discs comprises a core plate, in which each disc has its friction member on only one side of its core plate, each friction member is engageable with the core plate of an adjacent disc, each friction member of the discs of the second group has a heat resistance greater than that of the friction members of the discs of the first group, and each core plate engageable by the friction members of the discs of the first group is thicker than the core plates which are engageable by the friction members of the discs of the second group.

6. In a wet, multidisc, friction engaging device having a first set of discs and a second set of discs, each disc having a pair of opposite faces, the discs of the first and second sets being arranged in alternating relationship, the discs of the first set being engageable with the discs of the second set, each of said discs comprises a friction member on only one face thereof, and a core plate, the core plates of each of said discs, except for one, being opposed to, and engageable with a friction member of an adjacent disc; the improvement wherein:

said friction members include first friction members and second friction members, the coefficient of static friction of the first friction members being greater than the coefficient of static friction of the second friction members, and the coefficient of dynamic friction and heat resistance of the second friction members being greater than the coefficient of dynamic friction and heat resistance of the first friction members; and each core plate opposed to and engageable with one of said first friction members has a thickness larger than the thickness of each of the core plates opposed to and engageable with one of said second friction members.

7. A wet, multidisc friction engaging device according to claim 6 in which said first friction members are parts of said first discs and said second friction members are parts of said second discs.

8. A wet, multidisc friction engaging device according to claim 6 in which said first friction members are parts of said first discs and said second friction members are parts of said second discs, and in which the core plates of said first discs are supported on an inner member, and the core plates of said second discs are supported on an outer member surrounding said inner member.

* * * * *